(12) United States Patent
Schaap

(10) Patent No.: US 6,491,289 B1
(45) Date of Patent: Dec. 10, 2002

(54) OLEO-PNEUMATIC SHOCK ABSORBING SYSTEM

(76) Inventor: Elyakim Schaap, 27 Mishol Hahadass, Jerusalem, 97277 (IL)

( * ) Notice: Subject to any disclaimer, the term of this patent is extended or adjusted under 35 U.S.C. 154(b) by 0 days.

(21) Appl. No.: 09/713,819

(22) Filed: Nov. 14, 2000

(51) Int. Cl.$^7$ .................................................. F16F 5/00
(52) U.S. Cl. ..................... 267/64.23; 188/298; 188/269; 267/122
(58) Field of Search ..................... 267/122, 140.11, 267/140.12, 140.13, 64.23, 64.25, 64.27, 64.28, 64.11, 64.19, 64.26, 64.17; 188/298, 322.21, 269, 314, 315; 92/34–47; 248/631; 138/30, 26, 31; 244/104 FP

(56) References Cited

U.S. PATENT DOCUMENTS

| | | | |
|---|---|---|---|
| 1,516,004 A | * 11/1924 | Eckrode et al. | |
| 2,929,471 A | * 3/1960 | Schnitzer | |
| 2,942,838 A | * 6/1960 | Peters | |
| 2,944,639 A | * 7/1960 | Blake | |
| 3,074,435 A | * 1/1963 | Woestemeyer | |
| 3,105,574 A | * 10/1963 | Hoffmann et al. | |
| 3,151,856 A | * 10/1964 | Bresk et al. | |
| 3,213,764 A | * 10/1965 | Nelson et al. | |
| 3,692,296 A | 9/1972 | Higginbotham | |
| 3,752,270 A | * 8/1973 | Valdespino | 188/298 |
| 3,788,627 A | * 1/1974 | Wieland | |
| 3,807,717 A | * 4/1974 | Ito | |
| 3,837,444 A | 9/1974 | Allinquant et al. | |
| 3,909,035 A | * 9/1975 | Aikawa | |
| 4,352,487 A | * 10/1982 | Shtarkman | |
| 4,401,298 A | * 8/1983 | Eaton et al. | |
| 4,572,488 A | * 2/1986 | Holmberg, Jr. et al. | 188/298 |
| 4,614,255 A | * 9/1986 | Morita et al. | 188/298 |
| 4,673,168 A | * 6/1987 | Warmuth et al. | 267/64.27 |
| 4,690,389 A | * 9/1987 | West | 267/140.12 |
| 4,697,674 A | * 10/1987 | Tangorra | 188/298 |
| 4,712,780 A | * 12/1987 | Ficht et al. | 188/298 |
| 4,718,649 A | * 1/1988 | Pohlmann et al. | 267/122 |
| 4,784,378 A | * 11/1988 | Ford | |
| 4,790,520 A | * 12/1988 | Tanaka et al. | 188/298 |
| 4,815,574 A | * 3/1989 | Taylor et al. | 188/269 |
| 4,819,697 A | * 4/1989 | Randa et al. | |
| 4,856,626 A | * 8/1989 | Nakanishi | 267/122 |
| 4,858,733 A | * 8/1989 | Noguchi et al. | 188/298 |
| 4,858,898 A | * 8/1989 | Niikura et al. | |
| 4,880,213 A | * 11/1989 | Shihbori et al. | 188/298 |
| 4,921,223 A | * 5/1990 | Fukumura et al. | 267/122 |
| 4,921,227 A | * 5/1990 | Fukumura et al. | 267/122 |
| 4,955,589 A | * 9/1990 | West | |
| 4,997,009 A | * 3/1991 | Niikura et al. | |
| 5,088,580 A | * 2/1992 | Grothe et al. | 188/298 |
| 5,169,130 A | * 12/1992 | Thelamon et al. | |
| 5,193,788 A | * 3/1993 | Richter et al. | 267/122 |
| 5,219,051 A | * 6/1993 | Davis | 267/122 |
| 5,249,783 A | * 10/1993 | Davis | 188/298 |
| 5,775,472 A | * 7/1998 | Osterberg et al. | 267/122 |
| 5,797,430 A | * 8/1998 | Becké et al. | |
| 5,992,832 A | * 11/1999 | Lamorlette et al. | 267/64.27 |
| 6,003,849 A | * 12/1999 | Davis et al. | 267/122 |
| 6,016,841 A | * 1/2000 | Larsen | |
| 6,098,765 A | * 8/2000 | Kato et al. | |

FOREIGN PATENT DOCUMENTS

DE 4325172 * 9/1994

OTHER PUBLICATIONS

Yahoo! Reference: The Britannica Concise–*Kevlar*, [online], [retrieved on Jun. 25, 2002] Retrieved from Yahoo! Reference using Internet <http://education.yahoo.com/search/be?Ib=t&p=url%3Ak/kevlar>, 2 pages total.

* cited by examiner

*Primary Examiner*—Douglas C. Butler
(74) *Attorney, Agent, or Firm*—Townsend and Townsend and Crew LLP; Lynn Thompson Patent Agent

(57) ABSTRACT

The invention provides a shock-absorbing system, comprising an oil cell having bellows-shaped walls and a bi-fluid cell, the cells being in fluid communication via at least one flow restriction conduit.

15 Claims, 4 Drawing Sheets

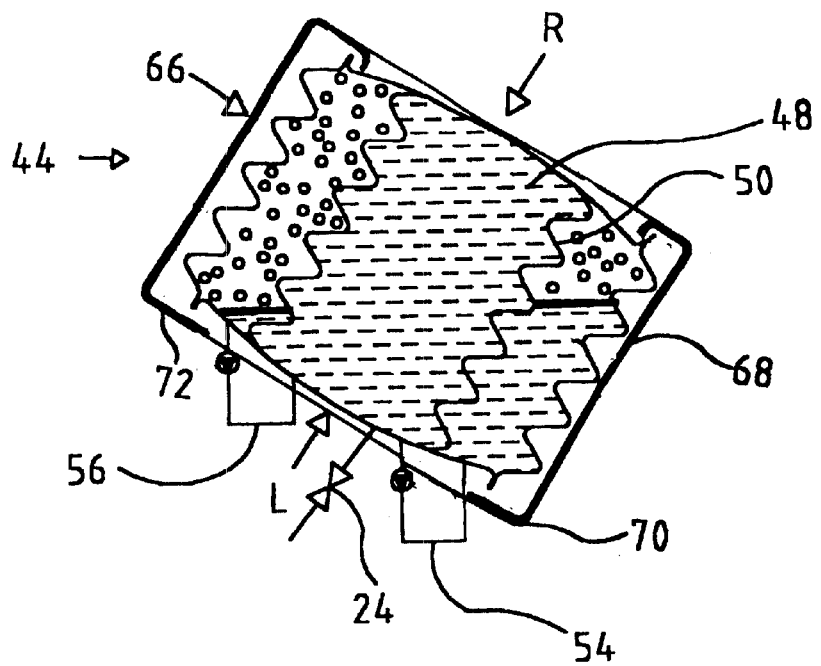
FIG_3A
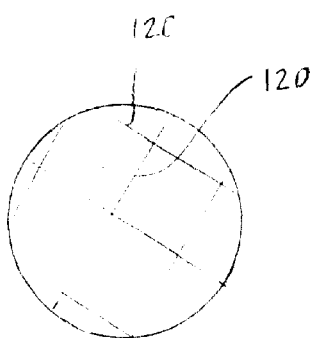
FIG_3B

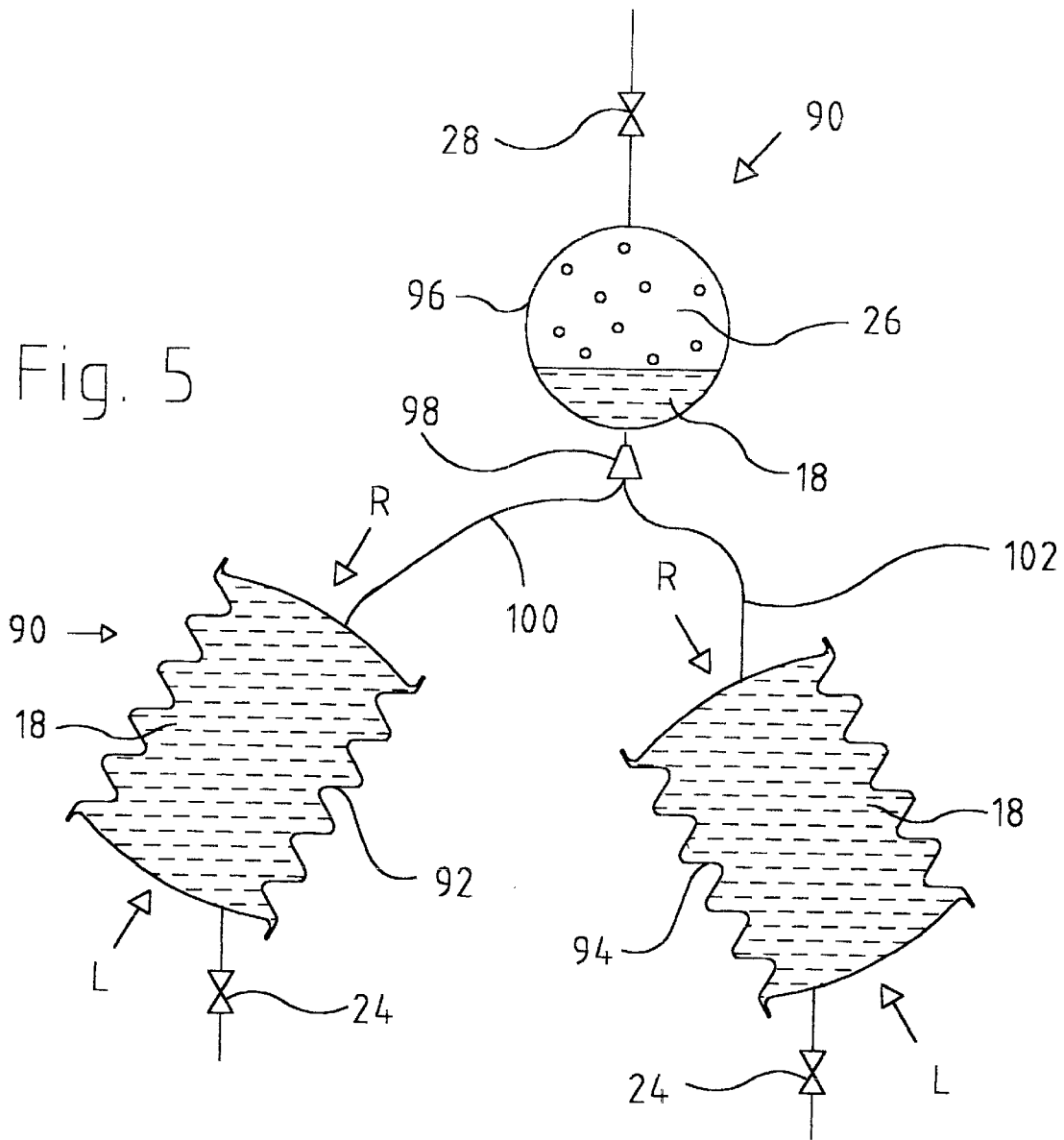

OLEO-PNEUMATIC SHOCK ABSORBING SYSTEM

This invention relates to an oleo-pneumatic shock absorbing system. More particularly, the invention provides a shock absorber wherein the oil and the gas, instead of being contained in a single cylinder, are distributed inside cells, and wherein particularly, oil is contained in a cell in the form of bellows whose internal volume changes in response to external force.

An oleo-pneumatic shock absorber is a device which decelerates a moving mass and converts much of its kinetic energy into heat due to the friction of oil being driven through narrow orifices. Although a conventional spring can also be arranged to decelerate a moving mass, the converted kinetic energy is stored as elastic deformation energy and not dissipated. A further significant difference between these two devices is that the spring provides increasingly higher resistance over its stroke, whereas an oleo-pneumatic shock absorber is designed to provide rapidly increasing resistance to a certain maximum, whereafter the resistance remains essentially constant. The consequence of this difference is that, for an equal maximum resistance, the oleo-pneumatic decelerate an equal moving mass over a much shorter distance.

Oleo-pneumatics have been known for many decades and are commonly used on medium size and large aircraft. Such devices contain oil which is driven through narrow orifices in a piston moving inside a cylinder and high pressure nitrogen that is further rapidly compressed during the beginning of the energy absorbing stroke.

Some shock absorbers use a compressed gas as the fluid absorbing energy and converting it into heat.

An example of a shock absorber using only a compressed gas is described by Higginbotham in U.S. Pat. No. 3,692,296.

A complex absorber using both oil and compressed gas is disclosed by Allinquant et al. in U.S. Pat. No. 3,837,444.

Prior art shock absorbers have a moving piston rod which requires a seal, which is subject to wear and deterioration. Also required are sealing end covers.

Prior art shock absorbers have certain disadvantages. In prior art oleo-pneumatic shock absorbers the piston rod can rotate relative to the cylinder cover through which it protrudes. Where such rotation is not desired a device must be provided to prevent this.

There is a need to accede into the oil cell for topping up with hydraulic oil to replace that which is lost by leakage. Alternatively, the whole shock absorber needs to be replaced after losing oil during service.

Primarily the above factors are responsible for the limited life of prior art absorbers, although there are additional problems resulting from metal fatigue.

It is therefore one of the objects of the present invention to obviate most of the disadvantages of prior art shock absorbers and to provide a device which greatly reduces the need for maintenance.

It is a further object of the present invention to provide a light weight shock absorber advantageous for use on vehicles and aircraft.

The present invention achieves the above objects by providing a shock-absorbing system, comprising a n oil cell having bellows-shaped sidewalls and a bi-fluid cell, said cells being in fluid communication with each other via at least one flow restriction conduit.

In the present specification:

A bi-fluid cell is defined as a vessel containing a constant quantity (by mass) of gas and a variable quantity of oil during operation.

A flow restriction conduit is a narrow aperture, orifice, tube, hose or pipe through which oil flows between the oil cell and the bi-fluid cell during operation.

In a preferred embodiment of the present invention there is provided a shock-absorbing system wherein the bi-fluid cell is also bellows-shaped and said cells are concentrically arranged, both cells having a common, bellows-shaped side wall.

In a most preferred embodiment of the present invention there is provided a shock-absorbing system wherein at least the oil cell is made of a fiber-resin composite, wherein said fibers are disposed in at least two distinct directions.

Yet further embodiments of the invention will be described hereinafter.

The functioning of the shock absorbing system of the present invention, solely by way of example, is described here as part of an aircraft landing gear.

Before any compressive load is applied, i.e., when the aircraft is in the air, the oil cell is fully extended and contains most of the oil. At this stage the bi-fluid cell contains all the gas and, at the cell bottom, a small quantity of oil.

As the aircraft lands and touches the ground the shock absorbing system experiences an impact, the component of which in the axial direction is a dynamic load.

The load, via the shock absorbing system, decelerates aircraft descent until the vertical component of the velocity is zero, when the shock absorber reaches the end of its stroke. Subsequently the oil cell starts to re-expand until the weight of the aircraft is in equilibrium with the load. The shock absorbing system now supports the aircraft and henceforth the load is essentially static.

Depending on the rate of the application of the load on the shock absorbing system, the latter behaves as an elastic spring or as a damper, as explained below.

As a consequence of the different characters of the gas reaction and the flow reaction at low oil flow velocities, i.e., low rate of application of the load, the oil flow reaction is small, the gas reaction is dominant and the shock absorber behaves more like an elastic spring. At high oil flow velocities, i.e., high rate of application of the load, the oil flow reaction is large and dominant and the shock absorber behaves more like a damper.

Generally low rate of application of the load results from disturbance of the equilibrium at a static load. For example, if one considers an aircraft while taxiing, a low rate of application of the load may appear as a consequence of running over an obstacle.

During the compression stroke, the shock absorber or the shock absorbing system, according to the present specification, converts the kinetic energy of a moving mass partly into elastic energy stored in the compressed gas and partly dissipates it as heat due to the friction of the oil flowing in the flow restriction conduit from one compartment into the other.

During subsequent gas expansion the shock absorber partly converts the elastic energy stored in the compressed gas back into kinetic energy of said mass, moving now in a direction opposite to the original motion and partly dissipates it as heat, due to the friction of the oil flowing in the flow restriction conduit back into the oil cell from where it originated.

The initial volume of the bi-fluid cell is arranged so that at maximum compression, volumetric capacity is sufficient to contain both the gas compressed to the desired maximum pressure and all the oil expelled from the oil cell during compression.

As an example, suppose that the maximum stroke is 60% of the active length of the oil cell and suppose that the volume of the compressed gas is 10% of the volume of the gas at the extended condition. With such proportions it can be shown that the volume of the gas cell at the extended condition should be twice the volume of the oil cell at that condition.

One option of the condition of the shock absorbing system before application of the load is to set the gas pressure equal to or slightly more than the ambient pressure and to have the pressure at the maximum possible stroke (and consequently the initial cell volume ratio) as compatible with the desired reaction variation during the travel.

Explanation of the excess required beyond ambient pressure is given further on.

Another option, aimed at reducing the total volume of both cells and consequently the weight of the oil in the shock absorbing system, is to compress the gas at the extended condition much beyond the ambient pressure. The shock absorber sidewalls in the present invention are very flexible in the axial direction. For this reason and in order to prevent the shock absorber from expanding beyond the intended extended length, a stop is provided.

The stop can assume the form of an external cylinder the lower edge of which is provided with a flat, washer like annular rim. The inner diameter of the rim is smaller than the outer diameter of the bi-fluid cell in case of the attached cells configuration, or smaller than the outer diameter of the oil cell in case of the detached cells configuration.

In a shock absorbing system configurations with a stop, the shock absorber will start its travel only when the dynamic load exceeds a value corresponding to the initial gas pressure.

The shock absorbing system of the present invention is advantageous relative to prior art shock absorbers as explained below.

In prior art shock absorbers the piston rod can rotate relative to the cylinder cover through which it protrudes. Where such rotation is not desired a guide device must be provided. In shock absorbing systems as specified here the bellows shaped cell walls can be made twist resistant. Where made of composites, twist resisting bellows have at least three directions of fibers.

It will thus be realized that the novel device of the present invention serves to practically eliminate maintenance requirements, as the absence of a piston rod obviates the necessity of a rod seal.

Likewise, there is no need for seals in the end covers, as they can be permanently connected to the walls by bonding. There is also no need to accede into the oil and bi-fluid cells as there is no leakage and they are maintenance free.

Composite materials used can be designed to have a fatigue life exceeding the intended life of the shock absorber, while metallic prior art shock absorbers are prone to fatigue and must be dimensioned and their details designed to prevent fatigue failure. Consequently, for an identical quantity of oil, i.e., for identical dynamic load, composite shock absorbing systems are lighter than metallic shock absorbers. Low weight provides an important advantage when used on any vehicle, and not only on aircraft.

The invention will now be described in connection with certain preferred embodiments with reference to the following illustrative figures so that it may be more fully understood.

With specific reference now to the figures in detail, it is stressed that the particulars shown are by way of example and for purposes of illustrative discussion of the preferred embodiments of the present invention only and are presented in the cause of providing what is believed to be the most useful and readily understood description of the principles and conceptual aspects of the invention. In this regard, no attempt is made to show structural details of the invention in more detail than is necessary for a fundamental understanding of the invention, the description taken with the drawings making apparent to those skilled in the art how the several forms of the invention may be embodied in practice.

In the drawings:

FIG. 3A is a diagrammatic view of an embodiment where the two cells are disposed coaxially and a stop means is provided;

FIG. 3B is an exploded view illustrating fibers disposed in at least two distinct directions;

FIG. 5 is a diagrammatic view of an embodiment where two oil cells are served by a single bi-fluid cell.

Figure 1:
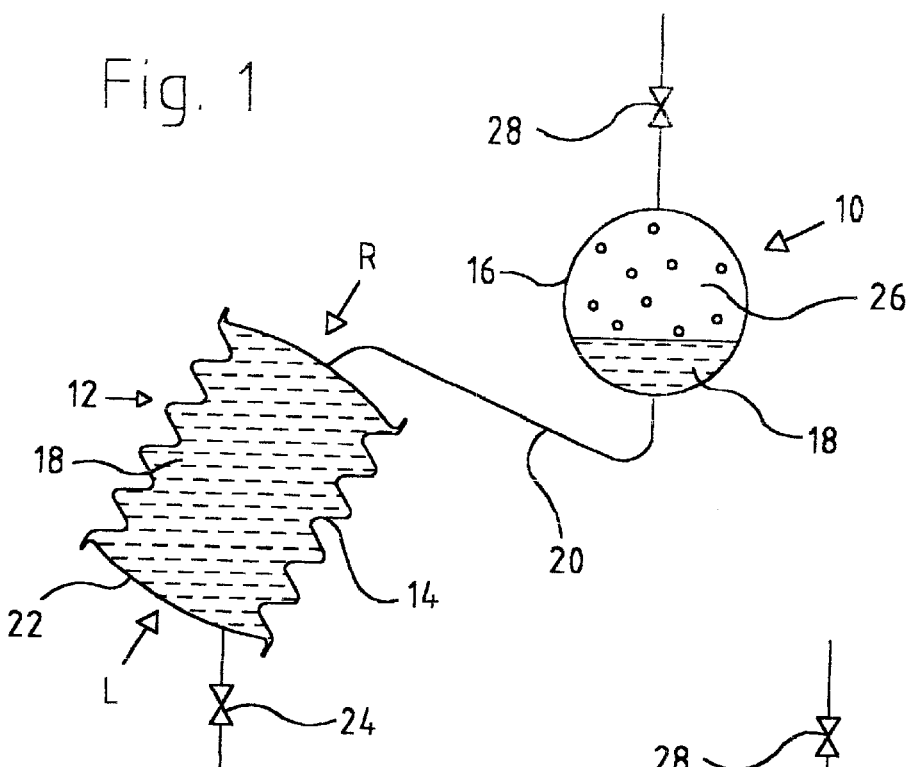
FIG. 1 is a diagrammatic view of one embodiment of the shock absorbing system according to the invention, having a flexible oil cell and a rigid bi-fluid cell.

There is seen in FIG. 1 a shock-absorbing system 10, comprising an oil cell 12 having bellows-shaped walls 14, and a bi-fluid cell 16.

The oil cell 12 is full of hydraulic oil 18 of a grade which does not evaporate or solidify under the range of temperatures and pressures at which the system is to operate.

The cells 12, 16 are in fluid communication with each other through a least one flow restriction conduit; in the shown embodiment fluid communication is effected by a single flow restriction conduit 20. Also in the present embodiment the bi-fluid cell 16 is rigid, and can suitably be made of a hollow sphere, as shown, or as a hollow cylinder.

The oil cell 12 is provided, at its lower face 22, with an oil valve 24 which serves both for filling, and for draining if necessary.

Arrow L indicates the load, for example the wheel fork of a motorcycle, while arrow R indicates reaction support, for example a vehicle chassis.

Under load the oil cell 12 is compressed, and a reduction of its axial length allows load movement. The cell's volume decreases, and as oil 18 is practically incompressible, and the oil cell 12 is at all times 100% full, surplus oil flows through the flow restriction conduit 20 from the oil cell 12 into the bi-fluid cell 16.

The bi-fluid cell 16 contains a gas 26, suitably nitrogen, under pressure. Other gases can be used, provided they do not liquefy under the pressure and temperature conditions prevalent in the bi-fluid cell. The gas 26 is dry, to prevent condensation of water vapor.

When oil 18 enters the bi-fluid cell 16, the volume available for the gas 26 decreases, causing an increase in gas pressure.

Oil 18 flows through the flow restriction conduit 20 when a pressure differential between the two cells 12, 16 exists.

During compression of the shock absorber due to an external load, pressure in the oil cell 12 is higher than that in the bi-fluid cell 16. Oil pressure in the oil cell 12 expresses itself as a force, which can be split into two components.

One component is due to gas pressure in the bi-fluid cell 16, and is approximately proportional to the inverse of the gas volume. The other force component is due to the pressure differential between the cells 12, 16. The latter is approximately proportional to the square of the oil flow velocity. The first of these components is the gas reaction while the other is the flow reaction.

The following procedure refers to the process of filling the absorber.

As manufactured, shock absorbing systems according to the present invention are made of bellows shaped elements, the length of which is intermediate between the fully extended and the fully compressed lengths. As manufactured the cells 12, 16 both contain air at atmospheric pressure.

The first step in preparation for use is to fill the oil cell 12 with oil 18, through oil valve 24, while the gas vent 28 is open. During this stage of filling, air is expelled from the oil cell 12 into the bi-fluid cell 16 through the flow restriction conduit 20. When the oil cell 12 is full, continued oil filling causes oil to flow into the bi-fluid cell 16. Oil filling continues until all air is expelled.

At this stage the oil quantity will probably be in excess of the required quantity. The excess can be evacuated through the gas vent by compressing the oil cell 12. If however there is a deficiency, oil 18 is added closing the gas vent 28 and continuing oil filling under pressure, which will cause the oil cell 12 to expand.

Subsequently, compressed gas 26 is pumped in through the vent 28 now serving as gas fill valve until the extended length is reached. Gas pressure axially expands the bellows shaped cell 12, overcoming structural resistance of the bellows. Gas filling continues until the desired gas pressure is reached.

Subsequently, the gas fill valve 28 is closed and the shock absorbing system 10 is ready for use.

With reference to the rest of the figures, similar reference numerals have been used to identify similar parts.

Figure 2:
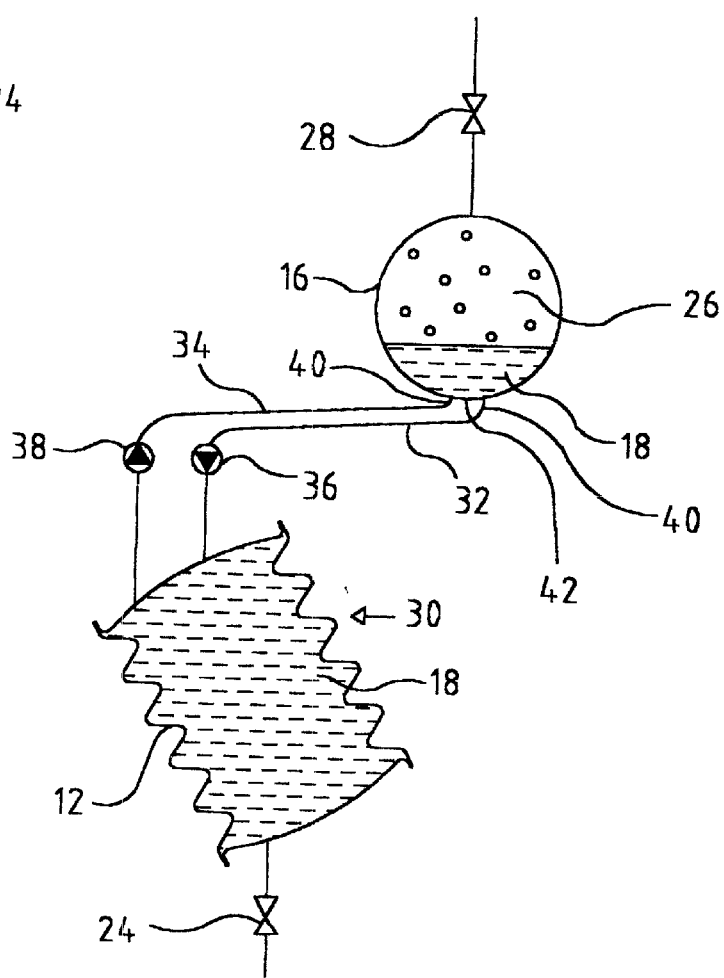
FIG. 2 is a diagrammatic view of an embodiment having two restrictor conduits.

Referring now to FIG. 2, there is seen a shock-absorbing system 30 wherein the cells 12, 16 are interconnected by two flow restriction conduits 32, 34. Each conduit is provided with a one-way valve 36, 38.

Two separate conduits 32, 34, having differing characteristics of flow restriction, allow flow resistance from the oil cell 12 to the bi-fluid cell 16 to be different from the hydraulic resistance in the opposite direction. Usually compression resistance should be high, while expansion resistance should be low.

The one-way valves 36, 38, assembled in opposing directions as shown, ensure that oil flow always follows the required direction.

The outlet(s) 40 of the bi-fluid cell 16 is positioned at its lowest point 42, thus preventing the passage of gas 26 from the bi-fluid cell 16 to the oil cell 12.

Figure 3:
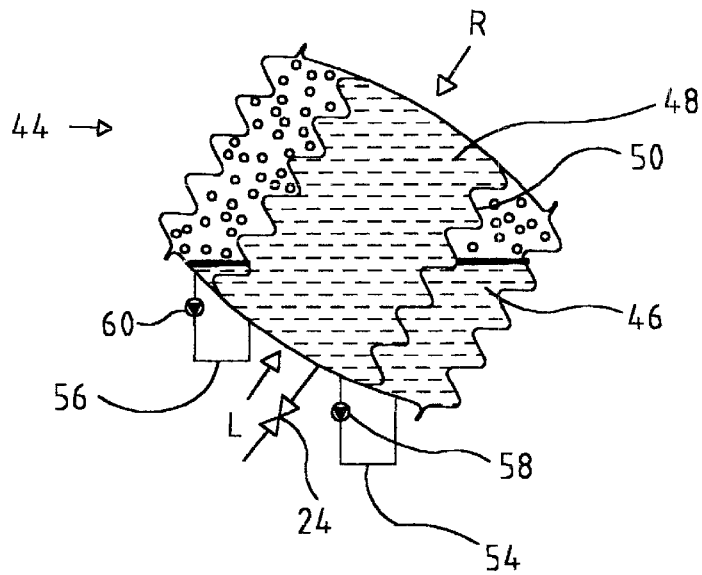
FIG. 3 is a diagrammatic view of an embodiment where the two cells are disposed coaxially.

FIG. 3 illustrates a further embodiment of a shock-absorbing system 44 where advantageously the bi-fluid cell 46, as well as the oil cell 48, is also bellows-shaped and the two cells 46, 48 are concentrically arranged. Both cells 46, 48 have common sidewall 50.

During compression both cells 46, 48 are compressed, thus making the gas volumetric ratio higher than by rigid bi-fluid cell embodiment.

The cells 46, 48 are interconnected by two flow restriction conduits 54, 56 each provided with a one-way valve 58, 60, similar to the previous embodiment. Conduit 54 provides the higher resistance during compression, and conduit 56 the lower resistance for expansion.

Figure 4:
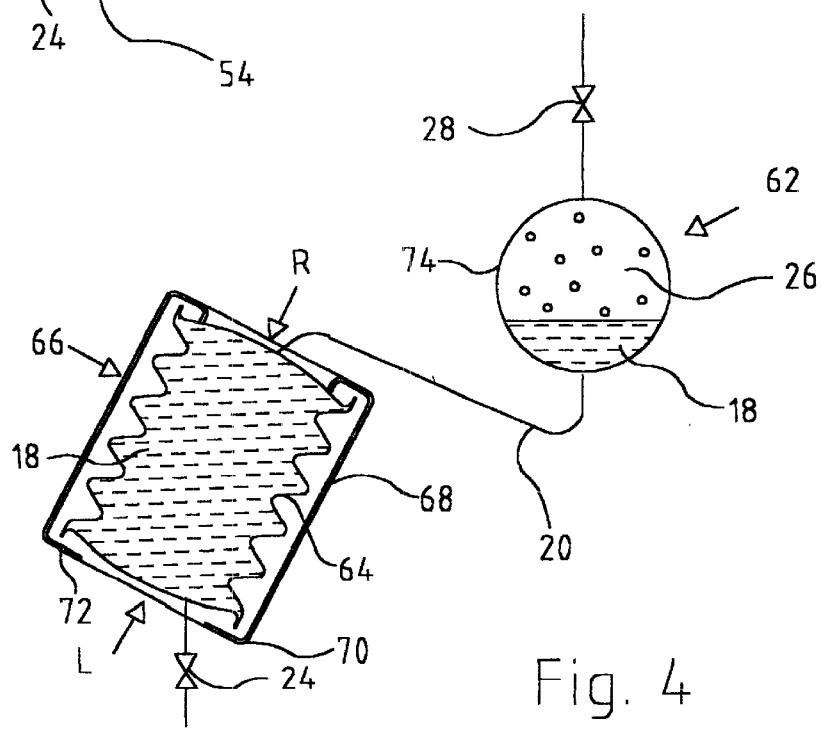
FIG. 4 is a diagrammatic view of an embodiment having stop means.

Seen in FIG. 4 is a shock-absorbing system 62 wherein the oil cell 64 is provided with stop means 66 for limiting the expansion thereof.

The stop means 66 is provided in order to prevent the oil cell 64 from expanding beyond its intended extended length when high compression gas is used. Such uncontrolled expansion could cause the bellows wall to exceed its allowed working stress.

In the shown embodiment the stop is in the form of an external cylinder 68, the lower edge 70 of which is provided with a flat, washer-like, annular rim 72.

In the shown embodiment where the oil cell 64 is separate from the bi-fluid cell 74, the rim 72 is smaller than the outer diameter of the oil cell 64.

FIG. 3A illustrates a stop means 66 provided for an embodiment similar to that shown in FIG. 3 where the bi-fluid cell is concentric to the oil cell 48, the inner diameter of the rim 72 would be smaller than the outer diameter of the bi-fluid cell 46. In this way, at least one of said oil cell and said bi-fluid cell is provided with stop means for limiting the expansion thereof.

Returning now to FIG. 1, the bi-fluid cell 16 is made of metal. Such metal will usually be steel or an aluminum alloy, but in aerospace applications where cost is a secondary consideration, material such as fiber-resin composite provides a more attractive strength/weight ratio. In some embodiments, at least said oil cell is made of a fiber-resin composite, wherein said fibers are disposed in at least two distinct directions.

Typical fiber materials are glass, carbon, or poly-para-phenylene terephthalamide (Kevlar®), the choice being a balance between performance demanded in a particular application and cost or weight.

In bellows-shaped cells, the fibers 120 are disposed in at least two distinct directions, such as approximately at 0 and 90 degrees with the axial direction, as illustrated in an exploded view in FIG. 3B.

In a further embodiment (not shown) the bellows-shaped cells are formed as a right conical surface. Such special form can be used to achieve desired operating characteristics relating to the force/movement resistance ratio at various stages of absorber compression.

FIG. 5 illustrates an embodiment of a shock-absorbing system 90 wherein a plurality of oil cells 92, 94 are connected to a single bi-fluid cell 96. As practically all vehicles use more than one shock absorber, such system offers attractive weight and cost savings, for example on the front fork of a motorcycle. A manifold connector 98 comprising a flow restrictor is shown connecting the flow restriction tubes 100, 102.

It will be evident to those skilled in the art that the invention is not limited to the details of the foregoing illustrative embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A shock-absorbing system, comprising:
  an oil cell filled with oil and having bellows-shaped walls;
  a bellows-shaped bi-fluid cell wherein said cells are concentrically arranged and have a common bellows-shaped side wall, the bi-fluid cell containing a constant mass of gas and a variable quantity of oil during operation of the system, wherein operation of the system comprises a compression stroke during which oil from said oil cell flows to said bi-fluid cell and an expansion stroke during which oil flows back to said oil cell; and at least one flow restriction conduit providing fluid communication between the cells.

2. A shock-absorbing system according to claim 1, wherein the at least one flow restriction conduit comprises at least two flow restriction conduits each provided with a one-way valve.

3. A shock-absorbing system according to claim 2, wherein the at least two flow restriction conduits comprises a first flow restriction conduit through which oil flows during the compression stroke and a second flow restriction conduit through which oil flows during the expansion stroke.

4. A shock-absorbing system according to claim 3, wherein the first and second flow restriction conduits are configured to provide different flow resistances.

5. A shock-absorbing system according to claim 4, wherein the first flow restriction conduit is configured to provide a higher flow resistance than the second flow restriction conduit.

6. A shock-absorbing system according to claim 1, wherein said oil cell is provided with stop means for limiting the expansion thereof.

7. A shock-absorbing system according to claim 1, wherein at least one of said oil cell and said bi-fluid cell is provided with stop means for limiting the expansion thereof.

8. A shock-absorbing system according to claim 7, wherein the stop means comprises an external cylinder having an annular rim which is smaller than the outer diameter of the bi-fluid cell.

9. A shock-absorbing system according to claim 1, wherein at least said oil cell is made of a fiber-resin composite, wherein said fibers are disposed in at least two distinct directions.

10. A shock-absorbing system according to claim 9, wherein the oil cell is compressible in an axial direction during the compression stroke and wherein the fibers are disposed approximately at 0 and 90 degrees relative to the axial direction.

11. A shock-absorbing system according to claim 9, wherein the fibers comprise glass, carbon, poly-para-phenylene terephthalamide or a combination thereof.

12. A shock-absorbing system according to claim 1, wherein said oil cell is provided with corrugations and wherein the envelope of the inside of said corrugations and the envelope of the outside of said corrugations are each selected from the group consisting of a right cylindrical surface and a right conical surface.

13. A shock-absorbing system according to claim 1, wherein the gas consists essentially of nitrogen.

14. A shock-absorbing system according to claim 1, wherein the gas comprises a compressed gas.

15. A shock-absorbing system according to claim 14, wherein the gas has a pre-determined gas pressure prior to operation of the system.

* * * * *